(12) United States Patent
McMillan

(10) Patent No.: US 7,561,056 B2
(45) Date of Patent: Jul. 14, 2009

(54) DIFFERENTIAL PRESSURE MEASURING PROBE WITH BOTTOMING INDICATOR

(75) Inventor: David T. McMillan, Boulder, CO (US)

(73) Assignee: Dieterich Standard, Inc., Boulder, CO (US)

( * ) Notice: Subject to any disclaimer, the term of this patent is extended or adjusted under 35 U.S.C. 154(b) by 324 days.

(21) Appl. No.: 11/692,009

(22) Filed: Mar. 27, 2007

(65) Prior Publication Data
US 2008/0238697 A1 Oct. 2, 2008

(51) Int. Cl.
*G08B 21/00* (2006.01)
(52) U.S. Cl. .......................................... 340/603; 73/756
(58) Field of Classification Search ................. 340/603, 340/611; 73/700, 756
See application file for complete search history.

(56) References Cited

U.S. PATENT DOCUMENTS

| | | | | |
|---|---|---|---|---|
| 4,957,007 A | * | 9/1990 | Gray | ........................ 73/861.65 |
| 5,969,266 A | * | 10/1999 | Mahoney et al. | .......... 73/861.65 |
| 6,470,755 B1 | * | 10/2002 | Beachey et al. | ................ 73/756 |
| 2005/0192727 A1 | * | 9/2005 | Shostak et al. | ................. 701/37 |

* cited by examiner

*Primary Examiner*—Jeffery Hofsass
(74) *Attorney, Agent, or Firm*—Richard W. Hanes; Hanes & Schutz, LLC

(57) ABSTRACT

A bottoming indication system indicates contact between an inner wall of a fluid conducting conduit and a tip of a differential pressure measuring probe. The system includes a piezoelectric device and an indicator. The piezoelectric device is affixed to the tip of the differential pressure measuring probe so that pressure exerted on the piezoelectric device by contact between the piezoelectric device and the inner wall of the conduit produces a voltage difference across the piezoelectric device. The indicator is in electrical communication with the piezoelectric device so that a voltage difference across the piezoelectric device activates the indicator to indicate contact between the inner wall of the conduit and the tip of the differential pressure measuring probe.

20 Claims, 3 Drawing Sheets

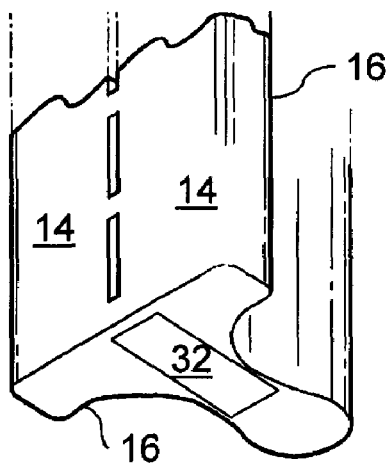
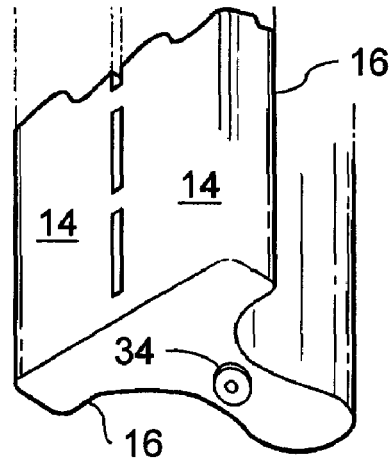
Fig. 3
Fig. 4
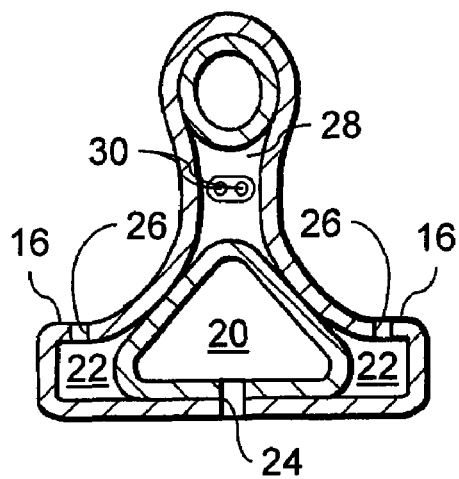
Fig. 2

DIFFERENTIAL PRESSURE MEASURING PROBE WITH BOTTOMING INDICATOR

BACKGROUND OF THE INVENTION

Differential pressure measuring probes are often used in pipes or other fluid carrying conduits to measure the rate of flow of the fluid in the conduit. A typical installation for the probes is accomplished by inserting the probe into the conduit until the tip of the probe makes contact with the wall of the conduit opposite the insertion point of the probe.

Current methods of inserting a differential pressure measuring probe into process-running conduits do not allow for accurate determination of when the tip of the probe makes contact with the opposite wall of the conduit. Currently, the only indication of contact between the probe and the wall is while the probe is inserted into the conduit is the stopping of the motion of the probe as it passes into the conduit. Since this indication relies on human interpretation, it is subject to human error.

DESCRIPTION OF THE DRAWINGS

FIG. 2 is a cross section diagram of the differential pressure measurement probe of FIG. 1.

FIG. 3 is an illustration showing one embodiment, of the piezoelectric device of FIG. 1.

FIG. 4 is an illustration showing another embodiment, of the piezoelectric device of FIG. 1.

DETAILED DESCRIPTION OF THE INVENTION

Figure 1:
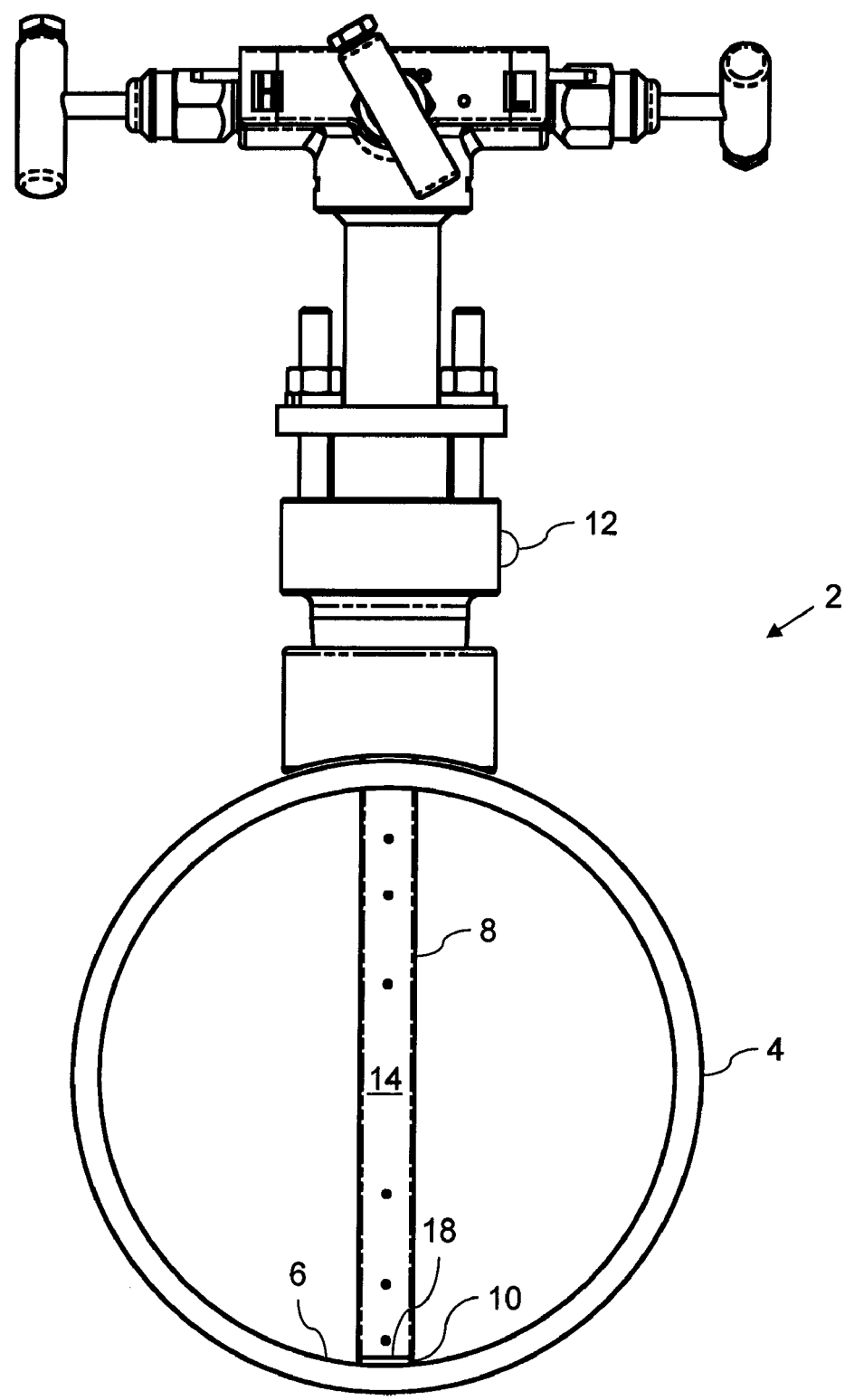
FIG. 1 is an illustration of one embodiment of the present invention differential pressure measuring probe having a bottoming indication system.

FIG. 1 is an illustration of one embodiment of a differential pressure measuring probe 2 for insertion into a fluid conducting conduit 4 having inner wall 6. Probe 2 includes elongated body 8, piezoelectric device 10, and indicator 12.

Elongated body 8 has upstream 14 and downstream 16 (FIGS. 2-4) faces and tip 18. Body 8 may have any cross-sectional shape suited for use as a differential pressure measuring probe.

Piezoelectric device 10 is affixed to tip 18 of body 8. Pressure exerted on piezoelectric device 10 by contact between piezoelectric device 10 and inner wall 6 of conduit 4 produces a voltage difference across piezoelectric device 10.

Indicator 12 is in electrical communication with piezoelectric device 10. A voltage difference across piezoelectric device 10 activates indicator 12 to indicate contact between inner wall 6 of conduit 4 and tip 18 of differential pressure measuring probe 2. In one embodiment, indicator 12 includes a visual indicator, such as a light emitting diode (LED). In an alternative embodiment, indicator 12 includes an audible indicator, such as a buzzer.

FIG. 2 is a cross-sectional diagram of body 8. In one embodiment, body 8 further includes at least first 20 and second 22 fluid carrying plenums within body 8. At least one opening 24 is formed in the upstream face 14 of body 8. Each opening 24 is in fluid communication with the first fluid conducting plenum 20. At least one opening 26 is formed in downstream aspect 16 of body 8. Each opening 26 is in fluid communication with second fluid conducting plenum 22. A longitudinal passage 28 is also formed within body 8.

In one embodiment, electrical conductors 30 provide the electrical communication between piezoelectric device 10 and indicator 12. In one embodiment, electrical conductors 30 are disposed in longitudinal passage 28.

FIG. 3 illustrates one embodiment where piezoelectric device 10 includes a piezo film sensor element 32. Piezo film sensor element 32 may be attached to tip 18 by any means. For example, piezo film sensor element 32 may be attached to tip 18 with an adhesive.

FIG. 4 illustrates another embodiment where piezoelectric device 10 includes a piezoresistive pressure sensor 34. Piezoresistive pressure sensor 34 may be attached to tip 18 by any means. For example, piezoresistive pressure sensor 34 may have a treaded portion which threads into tip 18.

Figure 5:
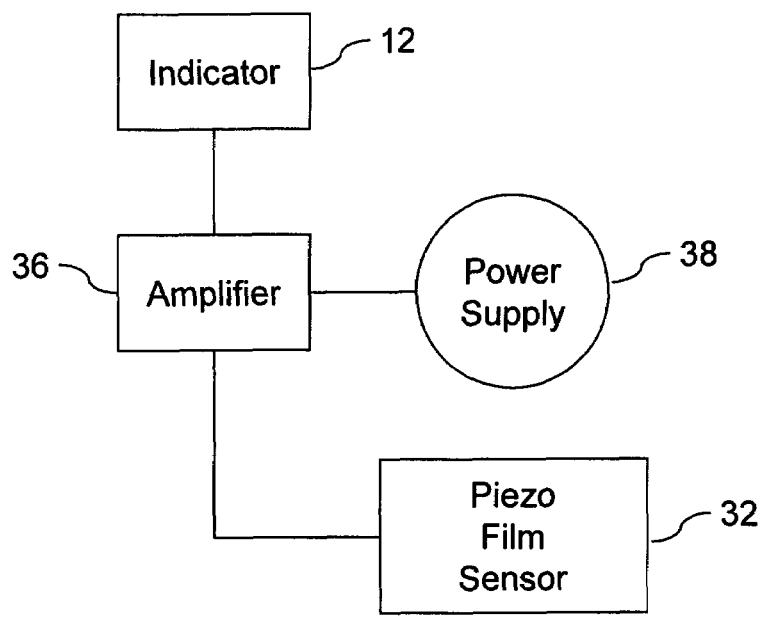
FIG. 5 is a block diagram of one embodiment of the present invention bottoming indication system.

FIG. 5 is a block diagram of one embodiment of the present invention bottoming indication system. Piezo film sensor 32 is in electrical communication with Indicator 12. In one embodiment, amplifier 36 amplifies the electrical communication from piezo film sensor 32 to indicator 12. Power supply 38 is in electrical communication with and provides electrical power to amplifier 36.

Figure 6:
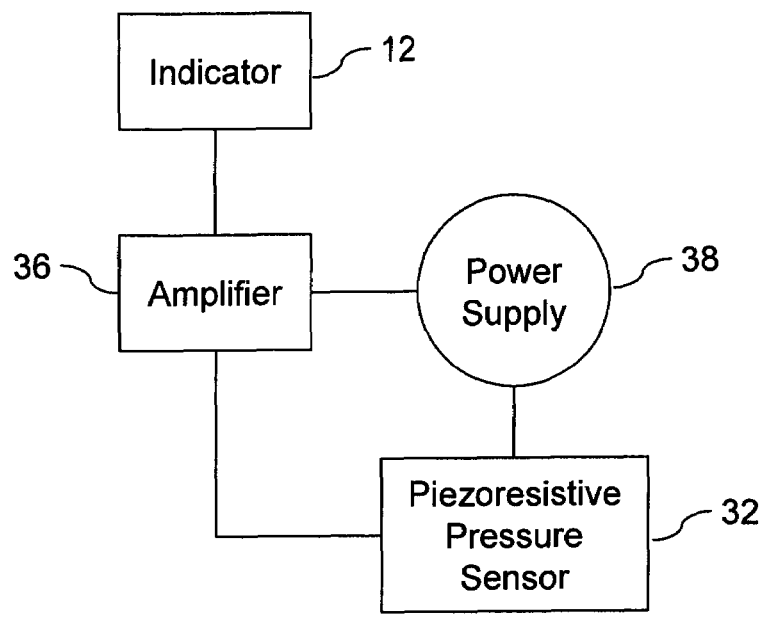
FIG. 6 is a block diagram of another embodiment of the present invention bottoming indication system.

FIG. 6 is a block diagram of an alternative embodiment of the present invention bottoming indication system. Piezoresistive pressure sensor 34 is in electrical communication with Indicator 12. In one embodiment, amplifier 36 amplifies the electrical communication from piezoresistive pressure sensor 34 to indicator 12. Power supply 38 is in electrical communication with and provides electrical power to piezoresistive pressure sensor 34 and amplifier 36.

As discussed above, the present invention may be embodied in a differential pressure measuring probe 2. In an alternative embodiment, the present invention is embodied in a bottom indication system for indicating contact between inner wall 6 of fluid conducting conduit 4 and tip 18 of differential pressure measuring probe 2. The bottom indication system includes piezoelectric device 10 and indicator 12.

Piezoelectric device 10 is affixed to tip 18 of differential pressure measuring probe 2. Pressure exerted on piezoelectric device 10 by contact between piezoelectric device 10 and inner wall 6 of conduit 4 produces a voltage difference across piezoelectric device 10.

Indicator 12 is in electrical communication with piezoelectric device 10. A voltage difference across piezoelectric device 10 activates indicator 12 to indicate contact between inner wall 6 of conduit 4 and tip 18 of differential pressure measuring probe 2.

The foregoing description is only illustrative of the invention. Various alternatives, modifications, and variances can be devised by those skilled in the art without departing from the invention. Accordingly, the present invention embraces all such alternatives, modifications, and variances that fall within the scope of the described invention.

What is claimed is:

1. A bottoming indication system for indicating contact between an inner wall of a fluid conducting conduit and a tip of a differential pressure measuring probe, the system comprising:

a piezoelectric device affixed to the tip of the differential pressure measuring probe wherein pressure exerted on the piezoelectric device by contact between the piezoelectric device and the inner wall of the conduit produces a voltage difference across the piezoelectric device;

an indicator in electrical communication with the piezoelectric device wherein a voltage difference across the piezoelectric device activates the indicator to indicate contact between the inner wall of the conduit and the tip of the differential pressure measuring probe.

2. The system of claim 1 wherein the piezoelectric device includes a piezo film sensor element.

3. The system of claim 1 wherein the piezoelectric device includes a piezoresistive pressure sensor.

4. The system of claim 1 wherein the indicator includes a visual indicator.

5. The system of claim 1 wherein the indicator includes an audible indicator.

6. The system of claim 1 further including a power supply in electrical communication with the piezoelectric device for supplying electrical power to the piezoelectric device.

7. The system of claim 1 further including an electrical signal amplifier in electrical communication between the indicator and the piezoelectric device.

8. The system of claim 5 further including a power supply in electrical communication with the electrical signal amplifier for supplying electrical power to the electrical signal amplifier.

9. The system of claim 1 further including electrical conductors for providing the electrical communication between the piezoelectric device and the indicator.

10. The system of claim 9 wherein the differential pressure measuring probe further includes:
- an elongated body having upstream and downstream faces;
- at least first and second fluid carrying plenums within the body;
- a longitudinal passage within the body;
- at least one opening in the upstream face of the body, each opening in fluid communication with the first fluid conducting plenum;
- at least one opening in the downstream aspect of the body, each opening in fluid communication with the second fluid conducting plenum; and
- wherein the electrical conductors are disposed in the longitudinal passage.

11. A differential pressure measuring probe for insertion into a fluid conducting conduit having an inner wall, the probe comprising:
- an elongated body having upstream and downstream faces and a tip;
- at least first and second fluid carrying plenums within the body;
- at least one opening in the upstream face of the body, each opening in fluid communication with the first fluid conducting plenum;
- at least one opening in the downstream aspect of the body, each opening in fluid communication with the second fluid conducting plenum;
- a piezoelectric device affixed to the tip of the body wherein pressure exerted on the piezoelectric device by contact between the piezoelectric device and the inner wall of the conduit produces a voltage difference across the piezoelectric device;
- an indicator in electrical communication with the piezoelectric device wherein a voltage difference across the piezoelectric device activates the indicator to indicate contact between the inner wall of the conduit and the tip of the differential pressure measuring probe.

12. The system of claim 11 wherein the piezoelectric device includes a piezo film sensor element.

13. The system of claim 11 wherein the piezoelectric device includes a piezoresistive pressure sensor.

14. The system of claim 11 wherein the indicator includes a visual indicator.

15. The system of claim 11 wherein the indicator includes an audible indicator.

16. The system of claim 11 further including a power supply in electrical communication with the piezoelectric device for supplying electrical power to the piezoelectric device.

17. The system of claim 11 further including an electrical signal amplifier in electrical communication between the indicator and the piezoelectric device.

18. The system of claim 11 further including a power supply in electrical communication with the electrical signal amplifier for supplying electrical power to the electrical signal amplifier.

19. The system of claim 11 further including electrical conductors for providing the electrical communication between the piezoelectric device and the indicator.

20. The system of claim 19 wherein the body further includes a longitudinal passage within the body and wherein the electrical conductors are disposed in the longitudinal passage.

* * * * *